Sept. 7, 1926.  1,598,843
C. C. A. BAUERCAMPER
TRACTOR DRIVEN MOWER
Filed May 14, 1921   3 Sheets-Sheet 1
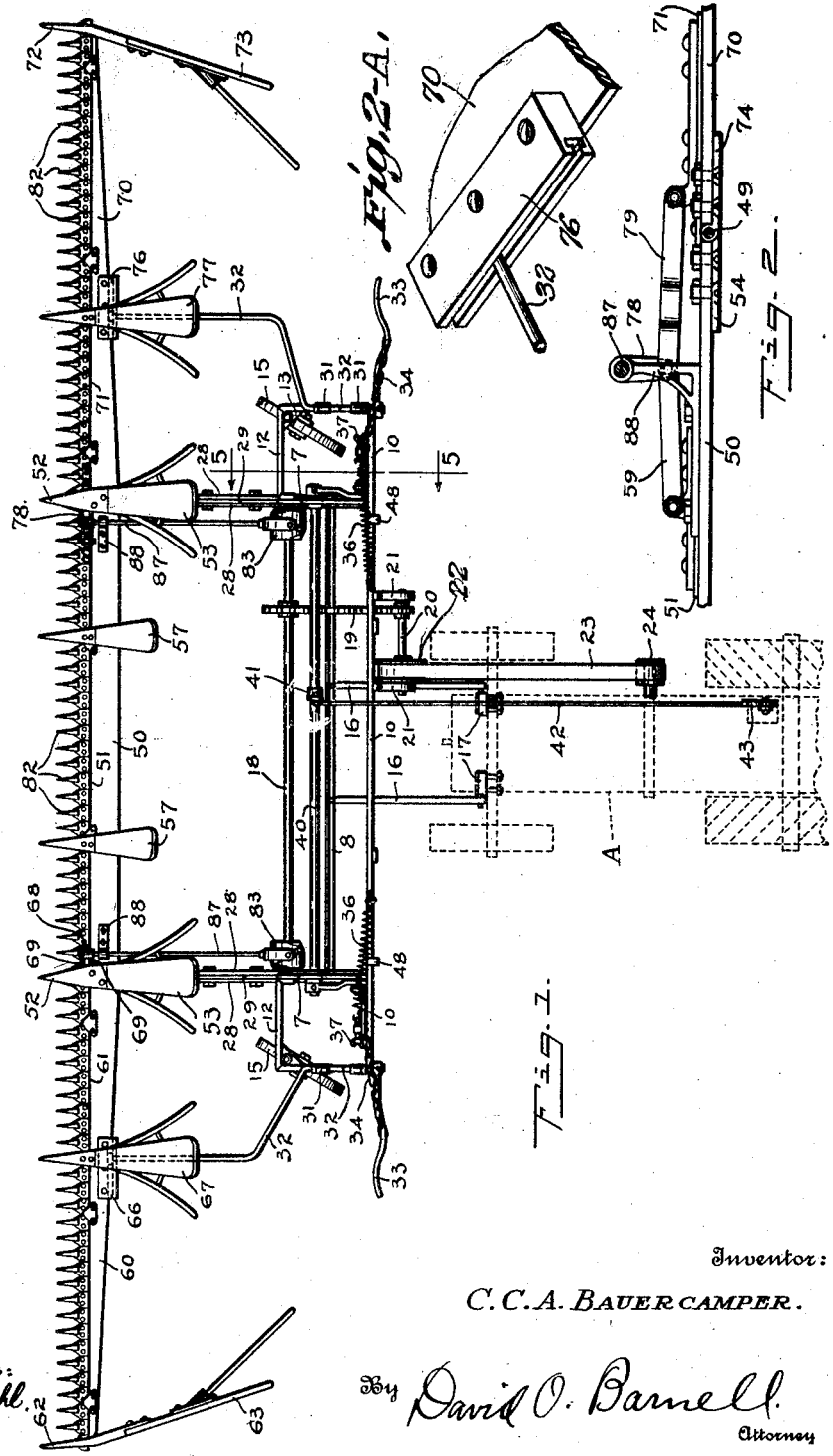
Inventor:
C. C. A. BAUERCAMPER.
By David O. Barnell.
Attorney
Witness:
R. J. Honomichl.

Sept. 7, 1926. 1,598,843
C. C. A. BAUERCAMPER
TRACTOR DRIVEN MOWER
Filed May 14, 1921  3 Sheets-Sheet 2

Inventor:
C. C. A. BAUERCAMPER.

Witness:
R. J. Horiowichl.

By David O. Barnell.
Attorney

Sept. 7, 1926.  
C. C. A. BAUERCAMPER  
1,598,843

TRACTOR DRIVEN MOWER

Filed May 14, 1921  3 Sheets-Sheet 3

Inventor:  
C.C.A. BAUERCAMPER.

Witness:  
R.J. Honomichl.

By David O. Barnell,  
Attorney

Patented Sept. 7, 1926.

1,598,843

UNITED STATES PATENT OFFICE.

CHARLES C. A. BAUERCAMPER, OF FAIRFIELD, IOWA.

TRACTOR-DRIVEN MOWER.

Application filed May 14, 1921. Serial No. 469,728.

My invention relates to mowers, or harvesters for hay crops and the like. It is the object of my invention to provide a mower especially adapted to be propelled by a tractor, the cutter mechanism being driven directly from the engine of the tractor instead of receiving power from groundwheels, and the mower being readily controlled by the driver of the tractor. A further object of my invention is to provide, in a mower having the above characteristics, a finger-bar of great length, formed in articulated sections whereby the same may readily conform to the contour of the ground over which it passes. A further object of my invention is to provide a tractor-driven mower in which the mower is pushed ahead of the tractor, and the ground effectually cleared prior to the passage of the tractor wheels thereover. A further object is to provide means for counter-balancing the weight of the finger-bar, whereby to effect a so-called "floating" arrangement thereof, by which only a small proportion of the weight of the mechanism is carried on the shoes which gage the relation of the finger-bar to the ground, and whereby also to make it easy for the operator to raise and lower the cutter mechanism for clearing obstructions or when making turns. A further object of my invention is to provide means whereby a finger-bar of great length may be so folded that the machine may be driven along roads, or through relatively narrow gates, and whereby the folded finger-bar may be readily extended to its working position when desired. A further object of my invention is to provide in a mower a strong, simple and durable driving mechanism for the sickle or cutter-bar, and, in general, to combine all of the foregoing characteristics in a strong, durable, inexpensively constructed machine having a minimum of weight, and capable of being driven with a minimum expenditure of power. More particular objects of the invention will be hereinafter set forth in detail.

Figure 3:
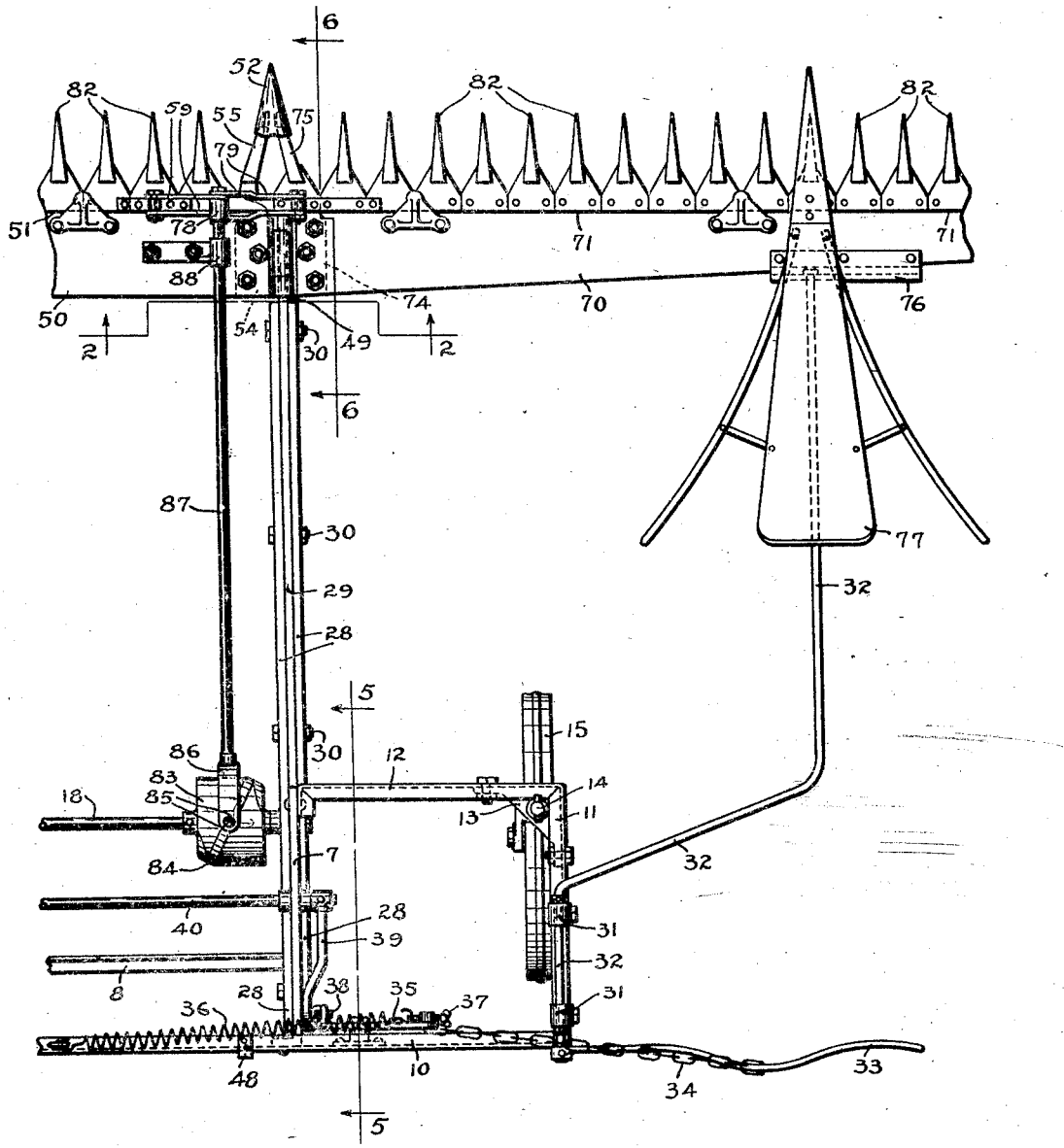
Figure 4:
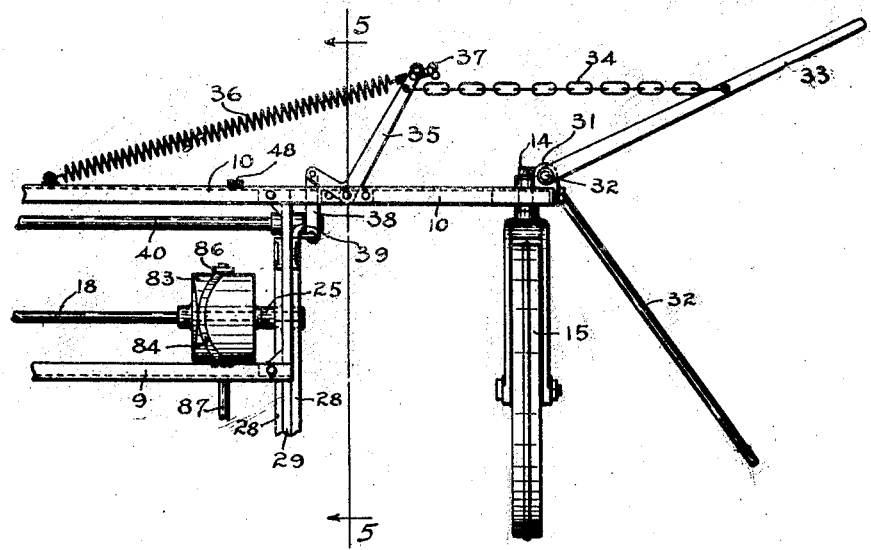
Figure 5:
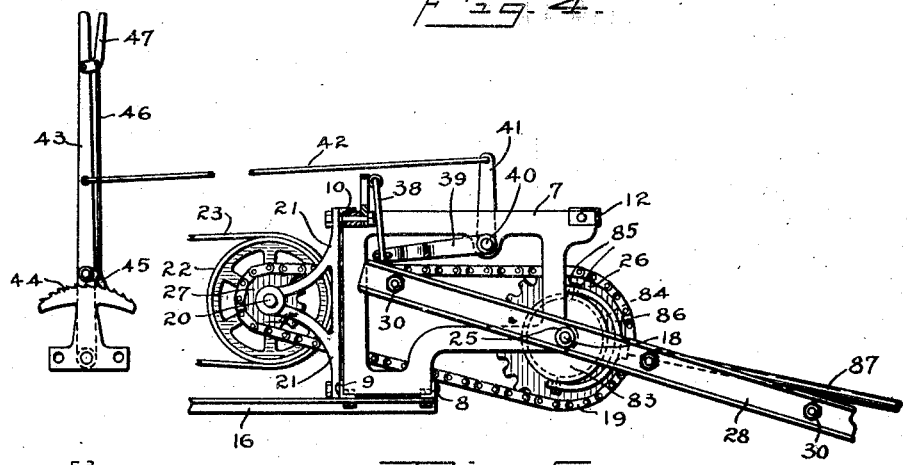

A mechanism embodying my invention is illustrated in the accompanying drawings, in which Fig. 1 is a plan view of the mower, Fig. 2 is a detail vertical transverse section on the line 2—2 of Fig. 3, Fig. 2ª is a detail perspective view of one of the push-rod connections, Fig. 3 is a partial plan view, on a larger scale than Fig. 1, Fig. 4 is a rear view of approximately the same portion of the machine shown in Fig. 3, Fig. 5 is a longitudinal vertical section on the line 5—5 of Figs. 1, 3 and 4, and Fig. 6 is a vertical section on the line 6—6 of Fig. 3.

In the illustrated construction there is a main rigid frame comprising a pair of vertically extending side-plates 7, connected to each other by front and rear lower cross-bars 8 and 9, and an upper cross-bar 10. Said cross-bar 10 extends laterally beyond the side-plates 7, and at the ends of said projecting portions there are forwardly extending portions 11, from the front ends of which the portions 12 extend inwardly and are secured to the upper front corners of the side-plates 7, as shown. At the junctures of the portions 11 and 12 are brackets or corner-braces 13 in which are formed sockets for the stems 14 of castor-wheels 15, said wheels forming the principal support for the frame. The frame-members 8, 9 and 10 are preferably rolled-steel angle-bars having their flanges disposed as shown, and the members 11 and 12 may be integral with the member 10. To the intermediate portions of the lower cross-bars 8 and 9 are rigidly secured the hitch-bars 16, which extend rearwardly therefrom, being parallel to each other and approximately horizontal. The rear ends of the hitch-bars are connected with pivot-blocks 17 which are secured to the front axle, or to the front portion of the frame, of the tractor by which the mower is to be driven. The axis of the pivotal connection between the hitch-bars and pivot-blocks 17 is horizontal, so that the mower-frame is freely movable vertically with respect to the tractor-frame, but is rigidly retained in a transverse relation to the tractor-frame. The general relation of the tractor to the mower is clearly indicated by the dotted outline A in Fig. 1, from which it will be seen that the mower-frame is pushed ahead of the tractor, and that said mower-frame, by being supported on the castor-wheels 15, is freely movable laterally when the tractor is turned to the right or left by the use of its steering mechanism in the usual way.

At the lower front portions of the side-plates 7 are bearings 25 for a shaft 18 which extends transversely of the frame, as shown. Said shaft carries a sprocket-wheel 26 which is connected by a chain 19 with a sprocket-wheel 27 carried on the counter-shaft 20. The countershaft is journaled in brackets 21 secured to and extending rearwardly from the frame-members 9 and 10, and carries a pulley 22 which is connected by a belt 23 with the power take-off pulley 24 of the tractor. On the laterally projecting portions of the bearings 25 are pivotally mounted the main push-bars 28 which extend forwardly in alinement with the side-plates 7 of the frame, the rear portions of said push-bars being forked and straddling said side-plates. Each of the main push-bars is preferably formed by two pieces of rolled steel, having the standard sectional form known as channels, the same being arranged back to back but having between the forwardly extending portions thereof a flat bar 29 of substantially the same thickness as the frame-plates 7, the channels and the bar 29 being secured together by bolts 30, as shown. On the outer frame-members 11 are mounted suitable bearings 31 in which are pivotally held portions of the auxiliary or swinging push-rods 32. The front ends of said auxiliary push-rods have crank-like portions which extend first outwardly from the frame and then forwardly parallel with the portions held in the bearings 31. Each of said auxiliary push-rods has at the rear end thereof a hand-lever 33 which normally extends outwardly from the frame, having substantially the angular relation to the forward or crank-portion of the push-rod shown in Fig. 4. Each of the levers 33 is connected by a chain 34 with the upper portion of a bell crank 35 which is pivoted on the frame-member 10 near the adjacent side-plate 7, as best shown in Figs. 4 and 5. To the upper end of each of the bell-cranks 35 is connected one end of a compensating-spring 36, which extends inwardly therefrom and is attached to the frame-member 10, as shown. Suitable adjusting-screws 37 are provided, by which the tension of the compensating-springs may be varied. Each of the bell-cranks 35 has a lower or inwardly extending arm from which a link 38 extends downwardly to connect the same with the rear end of a crank-arm 39 carried at the end of a transverse rocking-shaft 40, said shaft being mounted in suitable bearings formed therefor in the side-plates 7 of the frame. On the intermediate portion of the rocking-shaft 40 is an upwardly extending arm 41 from which a flexible tension-rod 42 extends rearwardly and is connected with the lifting-lever 43. The latter is mounted upon the body of the tractor at a position conveniently accessible to the operator thereof, and has the usual toothed segment or quadrant 44, a latch 45 for engaging the quadrant, and a latch-rod 46 and handle 47 for disengaging the latch from the quadrant. The crank-arms 39 at the ends of the rocking-shaft 40 normally engage the rear end-portions of the main push-bars 28, so that the downward thrust of the links 38, caused by the tension of the compensating-springs acting upon the bell-cranks 35, is communicated to said rear portions of the push-bars and thus tends to raise the front ends thereof. The cutter-mechanism, which is carried at the front ends of the push-bars 28 and push-rods 32, may be raised and lowered as a whole by moving the lifting-lever 43. Rearward movement of said lever actuates the rocking-shaft 40 to swing the crank-arms 39 downwardly, the downward movement of said arms presses the rear ends of the push-bars 28 downwardly and raises the front ends thereof, the downward movement of the links 38 causes the upwardly extending arms of the bell-cranks 35 to swing inwardly, said movement is communicated by the chains 34 to the levers 33, and the latter rotate the push-rods 32 so that the laterally offset front ends or crank-portions of said push-rods are elevated.

In the construction shown, I employ a finger-bar which is formed in three parts or sections, there being a central or intermediate section 50, and left and right sections 60 and 70, respectively, the adjoining ends of the several sections being hinged together, whereby the finger bar as a whole has sufficient flexibility to enable it to conform substantially with the transverse contour of the ground over which the mower is driven. Reciprocating sickles or cutter-bars 51, 61 and 71 are provided for the respective sections of the finger-bar, said cutter-bars carrying the usual knife-sections 80 which move in shearing relation to ledge-plates 81 secured in the knife-guards 82, the latter being arranged and secured to the sections of the finger-bar in the usual manner. The outer ends of the finger-bar sections 60 and 70 are provided with shoes 62 and 72, and dividers 63 and 73, which may be of the usual form ordinarily provided at the outer ends of mower finger-bars. At the ends of the central section 50 of the finger-bar, there are shoes 54 having hinge-lugs which extend slightly beyond the ends of the bar and interengage with similar lugs on shoes 74 secured on the inner ends of the sections 60 and 70, whereby to form the hinge-connections between the several finger-bar sections. The hinge-pintles 49 are formed integrally with the center-pieces 29 of the push-bars 28, said pintles projecting beyond the front ends of the channel side-pieces of said push-bars, as shown. The shoes 54 have integral forwardly extending portions 55 which form the end knife-guards for the central section 50 of the cutter-bar. To said guard-portions 55 are secured the divider-tips 52 which carry the shields or divider-boards 53. The shoes 74 have forwardly extended guard-portions 75, which form the end knife-guards for the outer sections of the finger-bar, and the ends of said guard-portions 75 are in alinement with the pintles 49 and fit in sockets therefor in the divider-tips 52, whereby to constitute additional hinge-members for connecting the finger-bar sections to each other.

At the rear sides of the finger-bar sections 60 and 70, intermediate the ends thereof, are secured the push-rod connection-members 66 and 76, each comprising a block having a T-slot in the rear edge thereof, in which the head at the front end of the respective push-rod 32 fits slidably, as shown in Fig. 2ª. By the described sliding connection between the push-rods 32 and the outer finger-bar-sections, said sections and the push-bars are freely swingable about their respective pivotal axes, notwithstanding that said axes are offset or unalined, as the variation in the arcs of travel is compensated by movement of the push-rod heads longitudinally of the T-slots in the connection-members. When the mower is not in operation and is being moved along roads or through gates, the outer finger-bar sections 60 and 70 are tilted upwardly to approximately vertical positions, by swinging the hand-levers 33 inwardly from the outer position thereof, such as shown in Fig. 4, to positions substantially parallel with the frame-member 10. Catch-plates 48 are provided, as shown, on said frame-member 10, beneath which the levers 33 may be engaged to retain the finger-bar sections 60 and 70 in the described elevated or transporting position.

For preventing entanglement of the mown grass or hay with the push-rods 32, there are provided suitable shields or dividers 67 and 77, of which the pointed tips are secured to knife-guards 82 in front of the respective push-rods, the fan-shaped rear portions of the dividers extending therefrom back over the front portions of the push-rods so as to divert the mown material laterally therefrom. Similar dividers 57 are secured upon two of the guards 82 of the central finger-bar section 50, said dividers 57 being so positioned as to divert the mown hay laterally from the paths of the tractor-wheels.

Figure 6:
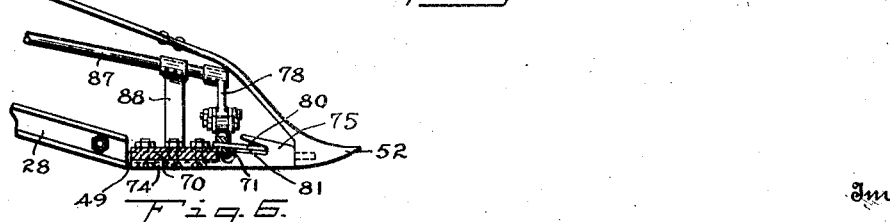

The reciprocating cutter bars 51, 61 and 71 are driven from the shaft 18, which is actuated from the power take-off pulley of the tractor-engine, through the hereinbefore described driving connections. On said shaft 18, adjacent to the frame side-plates 7, are secured oscillator-ring drivers 83, each of which comprises a cylindrical body concentric with the shaft 18 and having in the peripheral portion thereof an annular groove formed concentrically about an axis extending angularly to the shaft-axis but intersecting the same at the longitudinal center of the driver-body. In said annular groove is disposed the oscillator-ring 84 which is formed by two semi-annular shoes provided at the abutting ends thereof with semi-cylindrical or D-shaped radially extending lugs 85, whereby the two pairs of said lugs form diametrically opposite pins which fit into suitable openings therefor at the ends of a semi-annular yoke 86. The yokes 86 are carried at the rear ends of rocking-shafts 87, of which the axes are at right angles to the driver-shaft 18, said rocking-shafts extending forwardly and being inclined slightly downward, as shown in Figs. 5 and 6. The front portions of said rocking-shafts are supported by suitable bearing-standards 88 which are secured to the central cutter-bar section 50 adjacent to the ends thereof, and at the ends of the shafts are secured the crank-arms 68 and 78. The crank-arm 68 is connected with the cutter-bar 61 by a pair of links 69, and the crank-arm 78 is similarly connected with the cutter-bars 51 and 71 by pairs of links 59 and 79, respectively, as best shown in Figs. 2 and 3. It will be seen that during rotation of the shaft 18 and the ring-drivers 83, rotation of the rings 84 will be prevented by their connection with the yokes 86, while the drivers 83 will revolve within the rings. The rotary movement of the drivers causes, however, an oscillating movement of the rings which is communicated to the yokes and the rocking-shafts 87, and the movement of the latter is communicated to the cutter bars by the cranks 68 and 78 and the links 59, 69 and 79. As the pivotal axis of the push-bars 28 is coincident with the axis of the drive-shaft 18, it will be obvious that raising and lowering of the finger-bar will not effect the operation of the knife-bar driving devices. It will be seen also that, as the torsional action upon each of the rocking-shafts 87 is derived from both ends of the respective yoke carried thereby, there will be no end-thrust exerted upon the drive-shaft. The grooves in the drivers 83, in which the oscillator-rings are disposed, are preferably inclined oppositely to each other, whereby the cutting movements of the cutter-bar 61 will be opposite in direction to the movements of the cutter-bars 51 and 71, thus tending to balance and reduce the longitudinal vibration in the cutter mechanism.

From the foregoing the operation of the mower as a whole will be clearly apparent, and it will be seen that my invention provides a relatively simple and highly efficient mowing machine. For example, by making each section of the finger-bar eight feet in length, there is enabled the mowing of a twenty-four-foot swath, at the ordinary driving speed for farm tractors, and requiring the service of only one workman or operator for the machine. By the interconnection of the finger-bar sections with the compensating-springs, the finger-bar shoes may be caused to rest upon the ground as lightly as may be desired, and the lifting of the finger-bar to clear obstructions effected as easily as in ordinary mowers. The jointing or hinging of the finger-bar sections to each other, avoids any possibility of leaving unmown strips of ground in the swath traversed by the machine, and likewise enables the finger-bar as a whole to conform with the ground-contour as effectually as a plurality of shorter but independently mounted finger-bars. Finally, by the raising or elevating of the outer sections of the finger-bar to the described transporting position thereof, the machine with finger-bar sections of the length above instanced will readily pass along a road or through a gate having a width not greater than twelve feet, or slightly less than half the width of the swath which may be mown when the machine is in operation.

Now, having described my invention, what I claim and desire to secure by Letters Patent is:

1. In a mowing machine, a finger-bar comprising a series of longitudinally alined sections, each provided at the ends thereof with ground-engaging shoes, and dividers carried upon said shoes and extending therefrom above the finger-bar sections, the dividers at the adjoining ends of the sections being common to the respective sections.

2. In a mowing machine, a main frame, push-bars pivoted on transverse axes at the sides of said frame and extending forwardly therefrom, a finger-bar carried upon the front ends of said push-bars and having an intermediate section extending transversely between the same, said finger-bar having sections hinged to the ends of said intermediate section and extending laterally beyond the push-bars, auxiliary push-rods pivotally mounted on longitudinal axes at the sides of the main frame and having crank-like portions extending laterally and forwardly from the pivoted portions, said portions of the push-rods being connected with the laterally extending sections of the finger-bar, and means for moving said auxiliary push-rods about the pivotal axes thereof to swing said finger-bar sections to elevated positions.

3. In a machine of the class described, a finger-bar, a reciprocable sickle mounted therein, a drive-shaft extending substantially parallel with said finger-bar, a member mounted on said drive-shaft and having therein an annular groove extending angularly to the shaft-axis, an oscillator-ring disposed in said annular groove, a yoke pivotally connected with diametrically opposite portions of said oscillator-ring, a rocking-shaft secured to said yoke intermediate the points of connection thereof with the yoke, said shaft extending radially of the drive-shaft and adjacent to the finger-bar, a bearing mounted on the finger-bar and supporting the adjacent portion of the rocking-shaft, and a crank carried by said shaft and connected with the sickle.

C. C. A. BAUERCAMPER.